(12) United States Patent
Inoue et al.

(10) Patent No.: US 9,116,957 B1
(45) Date of Patent: Aug. 25, 2015

(54) SUBSTITUTE TERM SCORING

(71) Applicant: Google Inc., Mountain View, CA (US)

(72) Inventors: Kenji Inoue, Tokyo (JP); Tomoaki Yamauchi, Kamakura (JP); Kenichi Kurihara, Tokyo (JP)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/785,387

(22) Filed: Mar. 5, 2013

(51) Int. Cl.
*G06F 17/30* (2006.01)

(52) U.S. Cl.
CPC .................................. *G06F 17/30477* (2013.01)

(58) Field of Classification Search
USPC ........................................ 707/722, 723, 759
See application file for complete search history.

(56) References Cited

U.S. PATENT DOCUMENTS

| | | | |
|---|---|---|---|
| 7,565,345 B2 | 7/2009 | Bailey et al. | |
| 7,617,205 B2 | 11/2009 | Bailey et al. | |
| 7,870,147 B2 | 1/2011 | Bailey et al. | |
| 7,953,746 B1 | 5/2011 | Garg et al. | |
| 8,037,086 B1 | 10/2011 | Upstill et al. | |
| 8,041,730 B1 | 10/2011 | Upstill et al. | |
| 8,346,791 B1 * | 1/2013 | Shukla et al. | 707/759 |
| 8,538,984 B1 * | 9/2013 | Mahabal et al. | 707/769 |
| 8,631,019 B1 | 1/2014 | Shaw et al. | |
| 8,682,907 B1 * | 3/2014 | Yang et al. | 707/750 |
| 8,719,282 B1 | 5/2014 | Shaw et al. | |
| 8,762,389 B1 * | 6/2014 | Popovici et al. | 707/748 |
| 8,909,627 B1 * | 12/2014 | Popovici et al. | 707/723 |
| 2004/0122656 A1 | 6/2004 | Abir | |
| 2005/0055341 A1 * | 3/2005 | Haahr et al. | 707/3 |
| 2006/0230005 A1 | 10/2006 | Bailey et al. | |
| 2007/0219988 A1 * | 9/2007 | Mueller et al. | 707/5 |
| 2014/0358904 A1 * | 12/2014 | Nayak et al. | 707/723 |

OTHER PUBLICATIONS

Article entitled "The Google Hummingbird Patent", by Slawsky, dated Sep. 27, 2013.*

* cited by examiner

*Primary Examiner* — Mahesh Dwivedi
(74) *Attorney, Agent, or Firm* — Fish & Richardson P.C.

(57) ABSTRACT

Methods, systems, and apparatus, including computer programs encoded on a computer storage media are disclosed that involve a server receiving a search query including a query term and a substitute term for the query term and data corresponding to a set of documents. The server accesses a value corresponding to a relevance of the search query to a selected document from the set of documents and determines that the value satisfies a predetermined threshold. The server then generates a score for the selected document according to a first scoring model, the first scoring model including a first increment value for the substitute term. The first scoring model is different than a second scoring model used to generate scores for one or more other documents from the set of documents.

20 Claims, 4 Drawing Sheets

SUBSTITUTE TERM SCORING

TECHNICAL FIELD

This specification generally relates to scoring documents that are identified as being responsive to search queries.

BACKGROUND

Search systems use query revision engines to revise search queries, for example to include substitute terms (e.g., synonyms) of query terms. To identify a substitute term for a query term, query revisers evaluate candidate substitute terms according to various criteria, such as criteria that estimate whether, in a particular context, a candidate substitute term is a good synonym of the query term. Once search results are obtained using revised search queries, a scoring engine may then score search results based on an assumption that all occurrences of all substitute terms for a query term are equally weighted. In other words, the scoring engine may ignore the context of the substitute terms.

SUMMARY

According to one general aspect of the subject matter described in this specification, substitute terms may be scored in a context sensitive manner, for example, by incorporating signals that indicate the relevance of a particular query term to a particular document. This aspect may be embodied in methods, systems, and computer-readable storage media that include the actions of receiving a search query including a query term and a substitute term for the query term and receiving data corresponding to a set of documents. The actions also include accessing a value corresponding to a relevance of the search query to a selected document from the set of documents and determining that the value satisfies a predetermined threshold. In response to determining that the value satisfies the predetermined threshold, the actions include generating a score for the selected document according to a first scoring model, the first scoring model including a first increment value for the substitute term. In some implementations, the first scoring model is different than a second scoring model used to generate scores for other documents from the set of documents that have values corresponding to the relevance of the search query to each respective other document. In particular, the values of the other documents do not satisfy the predetermined threshold, and the second scoring model includes a second increment value for the substitute term that is different than the first increment value.

In some implementations, the first increment value is greater than the second increment value. In such implementations, the first increment value for the substitute term may be less than or equal to an increment value for the query term.

Some implementations involve receiving a signal corresponding to an aggregate number of clicks by users selecting the selected document when the query term was used, an aggregate duration of users' views of the selected document when the query term was used, or an average duration of users' views of the selected document when the query term was used.

In some implementations, the actions include outputting search results comprising the selected document, a rank of the selected document in the search results being based in part on the score of the selected document.

Implementations described in this specification may realize one or more of the following advantages. Some implementations may more accurately score substitute terms in documents based on the relevance of the original query term to the documents. As a result, search results including the documents may be ranked more accurately.

The details of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As described below, a document scoring engine may incorporate a signal indicating the relevance of an original query term to each document being scored. This relevance signal may be used to determine an increment value for substitute terms of the query term. The scoring engine can therefore apply different scores to the same substitute term in different documents based on the relevance of the original query term to each of the documents.

As referred to herein, "relevance" of a given query term to a particular document may express, for example, the relative quality of the document when it is included in search results generated in response to the query term. A relevance signal may be derived using any suitable parameters. For example, the signal may be based on a click count that indicates a frequency at which users click on the document in search results after entering the query term. Alternatively or in addition, the signal may be based on a skip count that indicates a frequency at which users skip over the document in search results after entering the query term. Moreover, the signal may be based on an impression duration (e.g., an aggregate or average duration) that quantifies how long users entering the search query view the document after selecting the document from search results. Any other suitable parameters or combination of the above parameters may be used.

Figure 1:
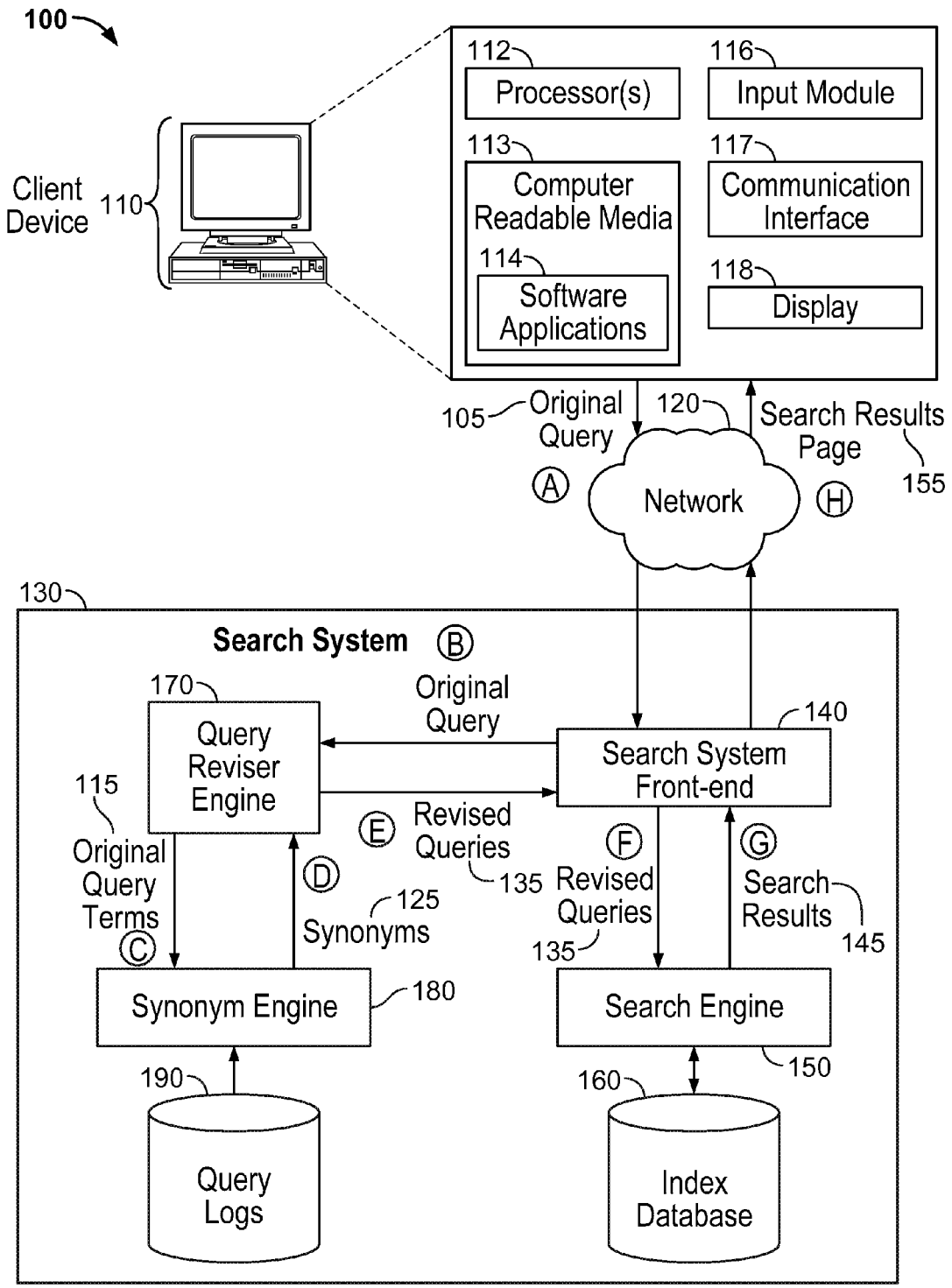
FIG. 1 is a diagram of an example system that uses substitute terms to generate search results.

FIG. 1 shows an example system 100 that uses substitute terms to generate search results. For example, the system 100 can use synonyms to generate search results. In general, the system 100 includes a client device 110 coupled to a search system 130 over a network 120. The search system 130 includes a search engine 150, a query reviser engine 170, and a synonym engine 180. The search system 130 receives a query 105, referred to by this specification as the "original query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original query 105. The search system 130 can generate or obtain other queries in numerous ways (e.g., by revising the original query 105).

In some implementations, the search system 130 can generate a revised query by adding to the original query 105 additional terms that are synonyms of one or more terms that occur in the original query 105. In other implementations, the search system 130 can generate a revised query by substituting terms that are synonyms of terms that occur in the original query 105, in place of the terms in the original query 105. As used by this specification, synonyms, i.e., terms that are used to generate revised queries, are also referred to as "substitute terms." The synonym engine 180 can identify the additional terms that are candidate synonyms for the one or more terms that occur in the original query. The query reviser engine 170 can generate the revised query. The search engine 150 can use the original query 105 and the revised queries to identify and rank search results. The search engine 150 can provide the identified search results 145 to the client device 110 on the search results page 155.

The synonym engine 180 can identify the synonyms the query reviser engine 170 can use to generate revised queries by evaluating terms included in previously received queries stored in a query logs database 190. The queries stored in the query logs database 190 can include previous queries where a user considered the results of the queries desirable. For example, the user can click the provided search results from a query, in effect, validating the search results. The queries stored in the query logs database 190 can include previous queries determined by the search system 130 as providing desirable results. For example, the search system 130 can perform a quality thresholding for returned search results from a query. The quality thresholding can include determining search results that have historically been returned for a particular query. Search results above the quality threshold can validate a query, which the search system 130 can then include in the query logs database 190.

For example, given a first term ("cat"), the synonym engine 180 can evaluate terms ("feline" or "banana") that are candidate synonyms for the original term. In addition, the synonym engine 180 can determine that certain terms are synonyms of the first term (as in the case of "feline"), and that other terms are not synonyms of the first term (as in the case of "banana"). The synonym engine 180 can base this determination on rules stored in a synonym rules database 185. For example, a synonym rule can be "feline" is a synonym for cat and "banana" is not a synonym for cat.

The search system 130 can define synonym rules to apply generally, or to apply only when particular conditions, or query contexts, are satisfied. For example, the query context of a synonym rule can specify one or more other terms that should be present in the query for the synonym rule to apply. Furthermore, query contexts can specify relative locations for the other terms (e.g., to the right or left of a query term under evaluation). In another example, query contexts can specify a general location (e.g., anywhere in the query). For example, a particular synonym rule can specify that the term "pet" is a synonym for the query term "dog," but only when the query term "dog" is followed by the term "food" in the query. Multiple distinct synonym rules can generate the same synonym for a given query term. For example, for the query term "dog" in the query "dog food," the term "pet" can be specified as a synonym for "dog" by both a synonym rule for "dog" in the general context and a synonym rule for "dog" when followed by "food."

The synonym rules can depend on query contexts that define other terms in the original query 105. In other words, a synonym rule need not apply in all situations. For example, when the term "cats" is used as a single-term query, the term "felines" can be considered a synonym for "cats". The synonym engine 180 can return the term "felines" to the query reviser engine 170 to generate a revised search query. In another example, when the query includes the term "cats" followed by the term "musical," a synonym rule can specify that the term "felines" is not a synonym for "cats." In some implementations, the synonym rules can be stored in the synonym rules database 185 for use by the synonym engine 180, the query reviser engine 170, or the search engine 150.

In the illustrative example of FIG. 1, the search system 130 can be implemented as computer programs installed on one or more computers in one or more locations that are coupled to each other through a network (e.g., network 120). The search system 130 includes a search system front end 140 (e.g., a "gateway server") that coordinates requests between other parts of the search system 130 and the client device 110. The search system 130 also includes one or more "engines": the search engine 150, a query reviser engine 170, and the synonym engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the synonym engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original query 105 from the client device 110. The search system front-end 140 routes the original query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original query terms 115 for the original query 105, and the client device 110 communicates the original query 105 to the search system 130 over the network 120. For example, the user can submit the original query 105 by initiating a search dialogue on the client device 110, speaking or typing the original query terms 115 of the original query 105, and then pressing a search initiation button or control on the client device 110. The client device 110 formulates the original query 105 (e.g., by specifying search parameters). The client device 110 transmits the original query 105 over the network 120 to the search system 130.

Although this specification refers to the query 105 as an "original" or an "initial" query, such reference is merely intended to distinguish this query from other queries, such as the revised queries that are described below. The designation of the original query 105 as "original" is not intended to require the original query 105 to be the first query that is entered by the user, or to be a query that is manually entered. For example, the original query 105 can be the second or subsequent query entered by the user. In another example, the original query 105 can be automatically derived (e.g., by the query reviser engine 170). In another example, the original query 105 can be modified based on prior queries entered by the user, location information, and the like.

During state (B), the search system front-end 140 receives the original query 105 and communicates the original query 105 to the query reviser engine 170. The query reviser engine 170 can generate one or more revised queries 135 based on the substance of the original query 105. In some implementations, the query reviser engine 170 generates a revised query by adding terms to the original query 105 using synonyms 125 for terms in the original query 105. In other implementations, the query reviser engine 170 generates a revised query by substituting the synonyms 125 for the corresponding terms of the original query 105. The query reviser engine 170 can obtain synonyms 125 for use in revising the original query 105 from the synonym engine 180.

During state (C), the query reviser engine 170 communicates original query terms 115 of the original query 105 to the synonym engine 180. The synonym engine 180 can use synonym rules included in the synonym rules database 185 to determine one or more synonyms 125 for one or more of the original query terms 115 of the original query 105.

The synonym engine 180 communicates synonyms 125 to the query reviser engine 170 during state (D). The query reviser engine 170 generates one or more revised queries 135 by adding synonyms 125 to the original query 105. In addition, the query reviser engine 170 can generate one or more revised queries 135 by substituting certain terms of the original query 105.

The query reviser engine 170 communicates the one or more revised queries 135 to the search system front-end 140 during state (E). The search system front-end 140 communicates the original query 105 along with the one or more revised queries 135 to the search engine 150 as all queries 137 during state (F). The search engine 150 generates search results 145 that it identifies as being responsive to the original query 105 and/or the one or more revised queries 135. The search engine 150 can identify search results 145 for each query using an index database 160 that stores indexed resources (e.g., web pages, images, or news articles on the Internet). The search engine 150 can compute scores for each of the identified search results 145 using a scoring engine that computes a score for an indexed resource using terms of the original query 105 and synonyms 125 of terms in the original query 105. The search engine 150 can combine and rank the identified search results 145 by score and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original query terms 115 or the synonyms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original query terms 115 of the original query 105 in a query box (or "search box"), located, for example, on the top of the search results page 155. In addition, the client device 110 can display the search results 145 in a search results box, for example, located on the left-hand side of the search results page 155.

Figure 2:
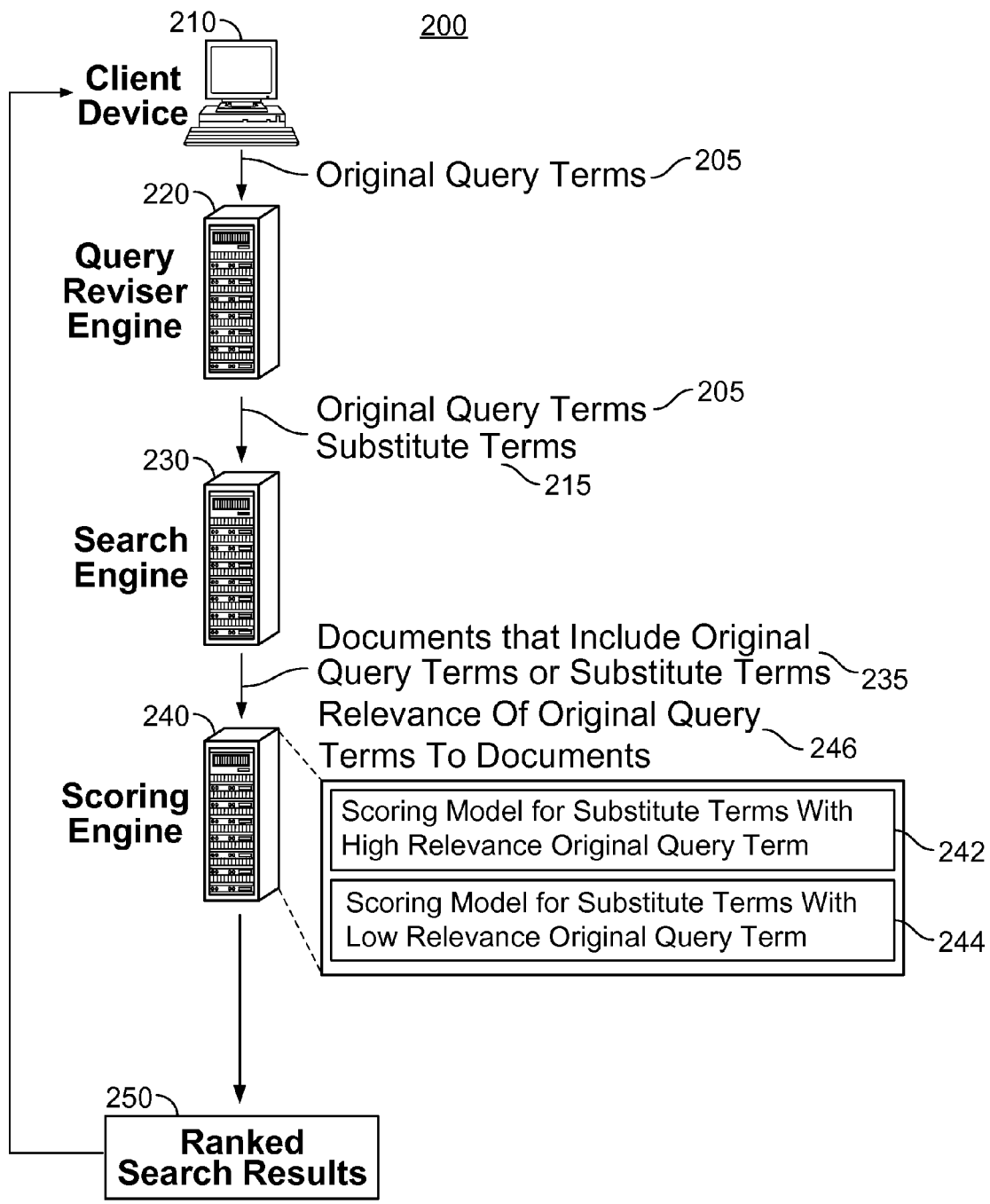
FIG. 2 is a diagram of an example system that uses a scoring model for substitute terms to score documents.

FIG. 2 shows an example system 200 that uses a scoring model for substitute terms to score documents. The system 200 includes a client device 210, a query reviser engine 220, a search engine 230, and a scoring engine 240. The entities illustrated in FIG. 2 can, for example, be implemented as part of the system illustrated in FIG. 1.

In general, a query including one or more original query terms 205 is received from a client device 210, and the query reviser engine 220 can identify one or more substitute terms 215 of the original query terms 205.

As used by this specification, the notation "A→B" indicates that, according to a particular substitute term rule, the term "B" is considered to be a substitute for the term "A." Using this rule, the query reviser engine 220 may generate revised queries by adding term "B" to an original query, by substituting term "B" for term "A" in the original query, or by performing other query revision techniques.

The search engine 230 can identify search results 235 using the synonyms 215 of the original query terms 205. To identify search results 235, the search engine 230 may, in some implementations, retrieve indexed documents that include the original query terms 205, synonyms 215 of the original query terms 205, or both. Additionally, the search engine 230 may obtain relevance signals corresponding to the relevance of the original query terms 205 to each of the indexed documents in order to generate a relevance signal 246 for each document. In some implementations, the relevance signal for each document may be retrieved, for example, from the index database 160 of FIG. 1, from the query logs database 190 of FIG. 1, from another server, or from a storage device accessible by the search engine 230. For example, the relevance signal may be received from a server that maintains information correlating the relevance of a particular original query term with a particular document. The signal 246 may be based on click counts, skip counts, impression duration, or any suitable combination thereof.

The scoring engine 240 then uses one or more scoring models to assign a score to each document identified by search results 235. The scoring engine 240 can use one scoring model 242 for query terms and/or for certain types of substitute terms and another scoring model 244 for other types of the synonyms 215. For example, as described below, the scoring model 242 may be used for scoring substitute terms associated with an original query term that has a high relevance to the document being scored; and the scoring model 244 may be used for scoring substitute terms associated with an original query term that has a low relevance to the document being scored.

A scoring model can, for example, count a number of occurrences of the original query terms 205 and synonyms 215 of the original query terms 205 in a particular document under evaluation. A scoring model specifies an increment value for instances of the original query terms 205 and the synonyms 215 of the original query terms 205 in documents. An example scoring model sums all occurrences of the original query terms 205 and synonyms 215 in a document, and assigns a score to the document or to a search result that references the document, based on the sum.

The scoring engine 240 can use different scoring models based on a signal 246 from the search engine 230 indicating the relevance of original query terms to the document being scored. When the signal 246 satisfies a threshold for a given document, a first scoring model 242 may be used that includes a first increment value for synonyms of the respective original query term. For example, when the original query term has a relevance signal 246 that exceeds a certain value, the synonyms of that term may receive a score equal to, or slightly less than, the score for the original query term in the document. However, when the signal 246 does not satisfy the threshold for a given document, a second scoring model 244 may be used that includes a lower increment value for substitute terms of the original query term. Alternatively or in addition, the original query term may also receive a lower score in the second scoring model than the original query term would receive in the first scoring model.

In some implementations, the signal 246 may be a normalized value between 0.0 and 1.0 indicating click count, skip count, impression duration, or a combination thereof. The threshold value may be determined empirically, or via statistical modeling. In certain implementations, the threshold value may be, for example, 0.5, 0.8, or 0.9.

Rather than a simple threshold function, the score for a substitute term in a given document may be based on a linear or nonlinear function of the relevance of the original query term to that document. For example, when the original query term has a high relevance (e.g., 0.9) the substitute query term may have relatively high increment value such as, for example, 0.9. When the original query term has a low relevance (e.g., 0.1) the substitute query term may have a relatively low increment values such as, for example, 0.1.

Any suitable combination of scoring models may be used, and there may be two or more different scoring models in any given implementation. In one example, under the first scoring model, the original query term and substitute terms for the original query term may receive an increment value of 1.0. Under the second scoring model, the original query term would receive an increment value of 1.0, while the substitute terms for the original for a term would receive an increment value of 0.1. In another example, under the first scoring model, the original query term would receive an increment value of 1.0, and substitute terms for the original query term would receive an increment value of 0.9. Under the second scoring model, the original query term would still receive an increment value of 1.0, but substitute terms for the original query term would receive an increment value of 0.1.

Once the documents are scored, the search results that reference the documents are ranked, and the ranked search results 250 are sent to the client device 210.

Figure 3:
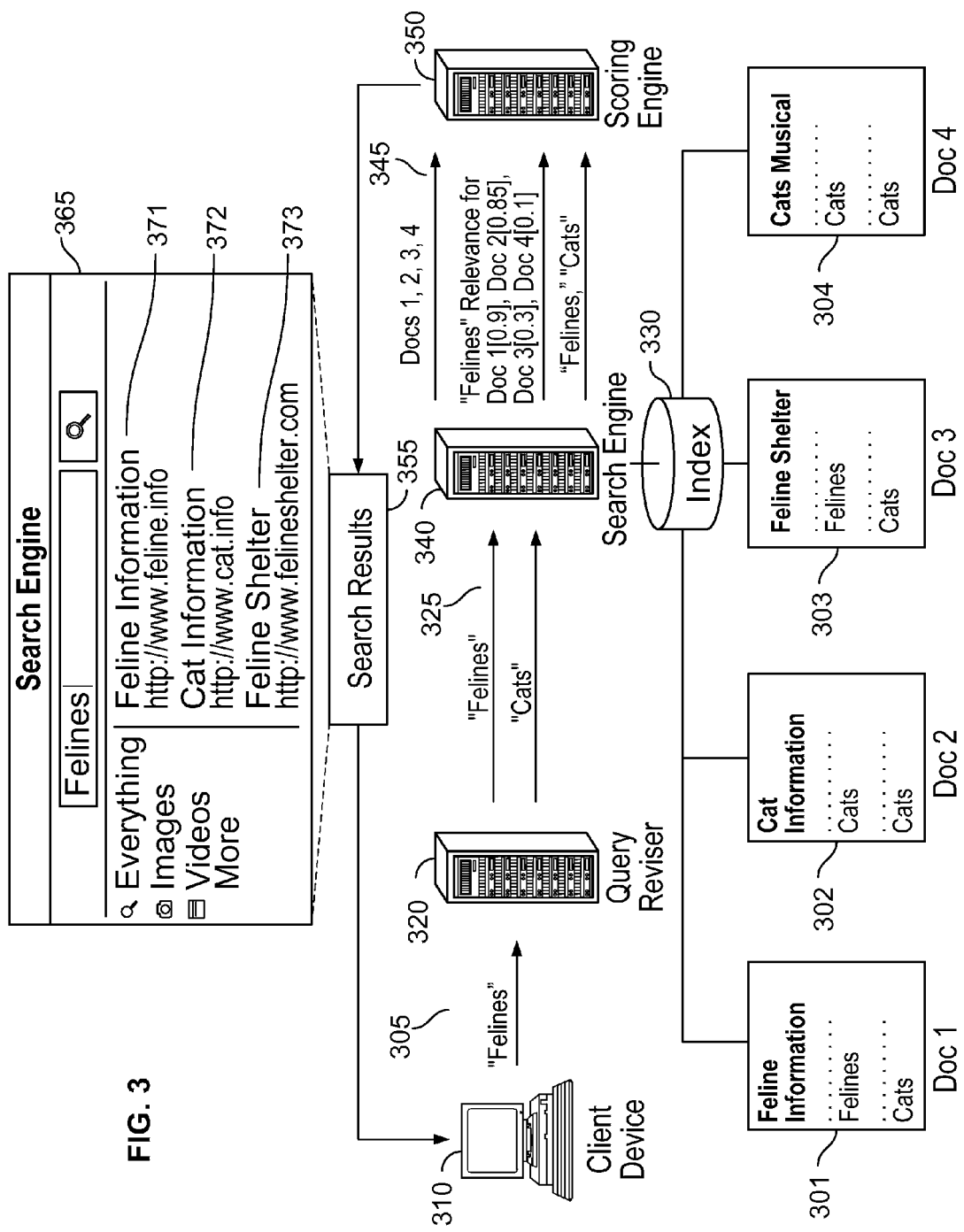
FIG. 3 is an example diagram that illustrates scoring search results using different scoring models for substitute terms.

FIG. 3 illustrates scoring search results using different scoring models for substitute terms. Initially, a client device 310 transmits a query 305 including the term "felines" to a query reviser 320. The query reviser 320 generates a synonym "cats" for the original query term "felines." Next, the query reviser 320 transmits a revised query 325 including the original query term and the synonym to a search engine 340.

Using the index 330, the search engine 340 identifies and retrieves four example documents 301, 302, 303, 304 using the query term "felines" and the synonym "cats". The first document 301 represents a webpage having a title of "Feline Information." The second document 302 represents a webpage having a title of "Cat Information." The third document 303 represents a webpage having a title of "Feline Shelter." And the fourth document 304 represents a webpage having a title of "Cats Musical."

In addition to the documents 301, 302, 303, 304, the search engine 340 obtains a relevance signal corresponding to the relevance of the original query term "felines" to each of the documents 301, 302, 303, 304. In this example, the relevance signals are normalized values between 0.0 and 1.0 corresponding to the relevance of the original query term "felines" to each document. In particular, the relevance of the query term "felines" is: 0.9 for the first document 301, 0.85 for the second document 302, 0.3 for the third document 303, and 0.1 for the fourth document 304. In this example, assume a relevance threshold of 0.5, i.e., documents that have relevance signals greater than 0.5 are of high relevance, and documents that have relevance signals less than 0.5 are of low relevance. The relevance signals for the documents 301, 302, 303, 304 indicate that the term "felines" has been determined to be of high relevance to the first and second documents 301, 302, and of low relevance to the third and fourth documents 303, 304. As discussed above, these relevance signals may be based on click count, skip count, impression duration, or any suitable combination thereof.

The search engine 340 may receive the relevance signal for each document from the index 330 or another server. Alternatively or in addition, the search engine 340 may access a storage device accessible by the search engine to retrieve the relevance signals. The search engine 340 then sends unranked search results 345, which include the four documents 301, 302, 303, 304, the relevance signal for each document, the original query term "felines," and the synonym "cats," to a scoring engine 350.

The scoring engine 350 selects an appropriate scoring model for each of the documents 301, 302, 303, 304 based on the respective relevance signals. In this example, the first document 301 has a relevance signal of 0.9 in relation to the original query term "felines." The scoring engine 350 compares this relevance signal with the threshold (e.g., 0.50). As a result of determining that the relevance signal for the first document exceeds the threshold, the scoring engine 350 applies a first scoring model to the first document 301. The first document includes one instance of the original query term "felines" and one instance of the substitute term "cats." Assuming that the first scoring model includes an increment value of 1.0 for each instance of the original query term "felines", and an increment value of 0.9 for each instance of the substitute term "cats," the first document 301 will receive a score of 1.9 using the first scoring model.

The second document 302 also has a relevance signal of 0.85 in relation to the original query term "felines." The scoring engine 350 compares this relevance signal with the threshold of 0.50. As a result of determining that the relevance signal for the second document exceeds the threshold, the scoring engine 350 applies the first scoring model to the second document 302. Since the second document 302 includes two instances of the substitute term "cats," and no instances of the original query term "felines," the second document 301 will receive a score of 1.8 using the first scoring model.

The third document 303 has a relevance signal of 0.3 in relation to the original query term "felines." The scoring engine 350 compares this relevance signal with the threshold of 0.50. As a result of determining that the relevance signal for the third document 303 does not satisfy the threshold, the scoring engine 350 applies a second scoring model to the third document. Like the first document, the third document includes one instance of the original query term "felines" and one instance of the substitute term "cats." However, assuming that the second scoring model includes an increment value of 1.0 for each instance of the original query term "felines", and an increment value of 0.1 for each instance of the substitute term "cats," the third document 303 will receive a score of only 1.1 using the second scoring model, whereas the first document received a score of 1.9 using the first scoring model.

The fourth document 304 also has a relevance signal of 0.1 in relation to the original query term "felines." The scoring engine 350 compares this relevance signal with the threshold of 0.50. As a result of determining that the relevance signal for the fourth document does not satisfy the threshold, the scoring engine 350 applies the second scoring model to the fourth document 304. Since the fourth document 304 includes two instances of the substitute term "cats," and no instances of the original query term "felines," the fourth document 304 will receive a score of 0.2 using the second scoring model.

After scoring the documents using the appropriate scoring models, the scoring engine 350 ranks the documents and outputs search results 355 to the client device 310. The search results are ranked according to the scores generated by the scoring engine 350.

The search results 355 may be ranked as illustrated in sample search results box 365. Using the scoring models, document 301 corresponds to the highest ranked search result 371 because the document 301 had a high relevance signal of 0.9, included one instance of the original query term "felines", and included one instance of the substitute term "cats". Document 302 corresponds to the second highest ranked search result 372 because the document 302 had a relatively high relevance signal of 0.85, and included two instances of the substitute term "cats." In document 303 corresponds to the third highest ranked search result 373 because the document 303 at a relevance signal of 0.3, included one instance of the original query term "felines," and included one instance of the substitute term "cats."

Figure 4:
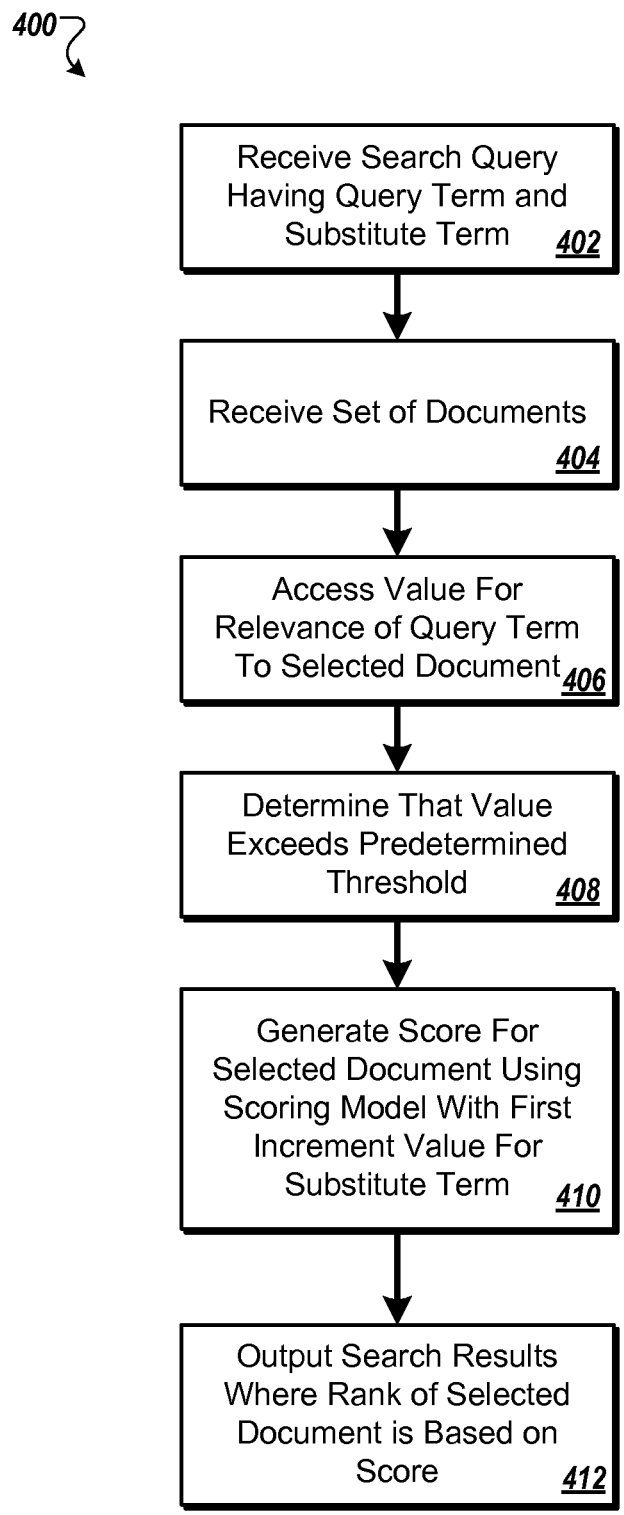
FIG. 4 is a flow chart of an example process for scoring substitute terms based on relevance of the original query term.

FIG. 4 is a flow chart of an example process 400 for scoring a document identified using a search query revised to include a synonym of a query term in the search query. The process 400 will be described as being performed by a scoring engine, for example, the scoring engine of FIG. 2. In general, the scoring engine determines a score for each of one or more documents according to an appropriate scoring model based on the associated relevance signal for the original query term, including counting occurrences of the substitute term in each document.

In step 402, the scoring engine receives a search query including an original query term and a substitute term for the original query term. While described for example purposes as a single query term in a single substitute term for the query term, any number of query terms and substitute terms may be included in actual implementations.

Next, in step 404, the scoring engine receives data corresponding to a set of documents. For example, the scoring engine may receive index results identifying a set of documents (e.g., webpages).

Then, in step 406, the scoring engine accesses a value (e.g., relevance signal) corresponding to a relevance of the original query term to one document from the set of documents. In some implementations, the scoring engine may access values corresponding to the relevance of the original query term to each document from the set of documents. To access the values, the scoring engine may receive the values from a search engine, may retrieve the values from another server, or may retrieve the values from a storage device accessible by the scoring engine. In some implementations, the value may be a signal corresponding to an aggregate number of clicks by users who selected the document after entering the original query term. In some implementations, the value may be a signal corresponding to an aggregate number of skips by users who did not select the document after entering the original query term. In some implementations, the value may be a signal corresponding to an aggregate duration of users who viewed the document after entering the original query term. In some implementations, the value may be a signal corresponding to an average duration of users who view the document after entering the original query term.

In step 408, the scoring engine determines that the value satisfies a predetermined threshold. The predetermined threshold may be, for example, empirically determined, or may be based on statistical models. In some implementations the predetermined threshold may be, for example, 0.3, 0.5, 0.7, 0.8, or any other suitable value. In response to determining that the value satisfies the predetermined threshold, in step 410, the scoring engine generates a score for the selected document according to a first scoring model. In the first scoring model, the scoring engine applies a first increment value for the substitute term. In some implementations, under the first scoring model, the first increment value for the substitute term is greater than or equal to an increment value for the original query term. In some implementations, the first increment value may be, for example, 0.5, 0.9, or 1.0. The scoring engine can combine the substitute term scores with scores for original query terms to compute an overall score for the document.

The first scoring model may be different than a second scoring model that is used to generate scores for other documents that have relevance signals that are less than the predetermined threshold. Under the second scoring model, the scoring engine may apply a second increment value for the substitute term that is different than the first increment value. For example, under the second scoring model, the scoring engine may apply a second increment value that is lower than the first increment value. In some implementations, the second increment value may be, for example, 0.1, 0.3, or 0.5.

Some implementations may involve determining an increment value for the substitute terms based on a linear or non-linear function of the relevance signal. For example, the increment value may be directly proportional to the relevance signal.

Some implementations may include outputting search results in step 412, where the search results include the selected document, and where a rank of the selected document in the search results is based, at least in part, on the score of the selected document.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable medium storing instructions executable by one or more computers which, upon such execution, cause the one or more computers to perform operations comprising:

receiving a search query including a query term and a substitute term for the query term;

receiving data corresponding to a set of documents;

accessing a value corresponding to a relevance of the search query to a selected document from the set of documents;

determining that the value satisfies a predetermined threshold; and in response to determining that the value satisfies the predetermined threshold, generating a score for the selected document according to a first scoring model, the first scoring model including a first increment value for the substitute term;

wherein the first scoring model is different than a second scoring model used to generate scores for one or more other documents from the set of documents, the one or more other documents having values corresponding to the relevance of the search query to each respective other document, where the values of the one or more other documents do not satisfy the predetermined threshold, the second scoring model having a second increment value for the substitute term that is different than the first increment value.

2. The computer-readable medium of claim 1 wherein accessing a value corresponding to a relevance of the search query to a selected document from the set of documents comprises receiving a signal corresponding to an aggregate number of clicks by users selecting the selected document when the query term was used.

3. The computer-readable medium of claim 1 wherein accessing a value corresponding to a relevance of the search query to a selected document from the set of documents comprises receiving a signal corresponding to an aggregate duration of users' views of the selected document when the query term was used.

4. The computer-readable medium of claim 1 wherein accessing a value corresponding to a relevance of the search query to a selected document from the set of documents comprises receiving a signal corresponding to an average duration of users' views of the selected document when the query term was used.

5. The computer-readable medium of claim 1 wherein the operations further comprise outputting search results comprising the selected document, a rank of the selected document in the search results being based in part on the score of the selected document.

6. The computer-readable medium of claim 1 wherein the first increment value is greater than the second increment value.

7. The computer-readable medium of claim 6 wherein, in the first scoring model, the first increment value for the substitute term is less than or equal to an increment value for the query term.

8. A computer-implemented method comprising:

receiving, at a server, a search query including a query term and a substitute term for the query term;

receiving, at the server, data corresponding to a set of documents;

accessing, by the server, a value corresponding to a relevance of the search query to a selected document from the set of documents;

determining, at the server, that the value satisfies a predetermined threshold; and in response to determining that the value satisfies the predetermined threshold, generating, at the server, a score for the selected document according to a first scoring model, the first scoring model including a first increment value for the substitute term;

wherein the first scoring model is different than a second scoring model used to generate scores for one or more other documents from the set of documents, the one or more other documents having values corresponding to the relevance of the search query to each respective other document, where the values of the one or more other documents do not satisfy the predetermined threshold, the second scoring model having a second increment value for the substitute term that is different than the first increment value.

9. The method of claim 8 wherein accessing a value corresponding to a relevance of the search query to a selected document from the set of documents comprises receiving a signal corresponding to an aggregate number of clicks by users selecting the selected document when the query term was used.

10. The method of claim 8 wherein accessing a value corresponding to a relevance of the search query to a selected document from the set of documents comprises receiving a signal corresponding to an aggregate duration of users' views of the selected document when the query term was used.

11. The method of claim 8 wherein accessing a value corresponding to a relevance of the search query to a selected document from the set of documents comprises receiving a signal corresponding to an average duration of users' views of the selected document when the query term was used.

12. The method of claim 8 further comprising outputting search results comprising the selected document, a rank of the selected document in the search results being based in part on the score of the selected document.

13. The method of claim 8 wherein the first increment value is greater than the second increment value.

14. The method of claim 13 wherein, in the first scoring model, the first increment value for the substitute term is less than or equal to an increment value for the query term.

15. A system comprising:
one or more computers and one or more storage devices storing instructions that are operable, when executed by the one or more computers, to cause the one or more computers to perform operations comprising:
receiving a search query including a query term and a substitute term for the query term;
receiving data corresponding to a set of documents;
accessing a value corresponding to a relevance of the search query to a selected document from the set of documents;
determining that the value satisfies a predetermined threshold; and
in response to determining that the value satisfies the predetermined threshold, generating a score for the selected document according to a first scoring model, the first scoring model including a first increment value for the substitute term;
wherein the first scoring model is different than a second scoring model used to generate scores for one or more other documents from the set of documents, the one or more other documents having values corresponding to the relevance of the search query to each respective other document, where the values of the one or more other documents do not satisfy the predetermined threshold, the second scoring model having a second increment value for the substitute term that is different than the first increment value.

16. The system of claim 15 wherein accessing a value corresponding to a relevance of the search query to a selected document from the set of documents comprises receiving a signal corresponding to an aggregate number of clicks by users selecting the selected document when the query term was used.

17. The system of claim 15 wherein accessing a value corresponding to a relevance of the search query to a selected document from the set of documents comprises receiving a signal corresponding to an aggregate duration of users' views of the selected document when the query term was used.

18. The system of claim 15 wherein accessing a value corresponding to a relevance of the search query to a selected document from the set of documents comprises receiving a signal corresponding to an average duration of users' views of the selected document when the query term was used.

19. The system of claim 15 wherein the operations further comprise outputting search results comprising the selected document, a rank of the selected document in the search results being based in part on the score of the selected document.

20. The system of claim 15 wherein the first increment value is greater than the second increment value.

* * * * *